Aug. 12, 1952     C. REICHERT     2,606,770
FOLDABLE WHEEL FOR HAND TRUCKS
Filed June 15, 1951
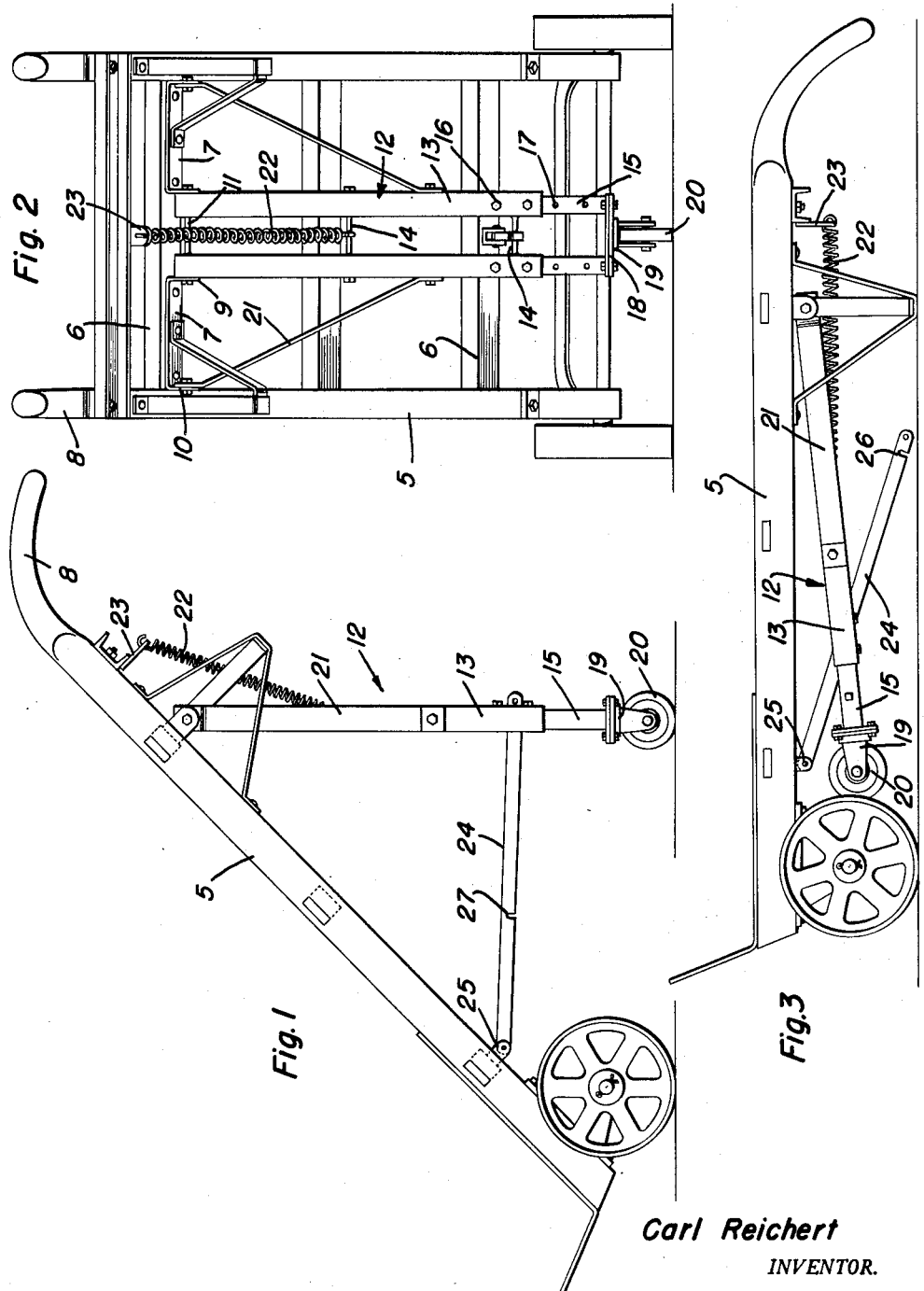
Carl Reichert
INVENTOR.

Patented Aug. 12, 1952

2,606,770

UNITED STATES PATENT OFFICE 2,606,770

FOLDABLE WHEEL FOR HAND TRUCKS

Carl Reichert, Fort Wayne, Ind.

Application June 15, 1951, Serial No. 231,692

1 Claim. (Cl. 280—41)

The present invention relates to new and useful improvements in hand trucks and more particularly to a foldable wheel which may be used to support the load and thus relieve the user of the truck from the weight thereof.

An important object of the invention is to provide a foldable wheel including a pivoted supporting leg or prop positioned adjacent the handle of the truck for raising and lowering the wheel into and out of ground engaging position and providing a locking lever for holding the wheel in either position.

Another object is to provide an improved folding leg or prop construction for the wheel to balance the truck and prevent tilting or side sway when the load is supported on the foldable wheel.

A further object is to provide an attachment of this character adapted for securing to a hand truck without necessitating any changes or alterations in the construction thereof, and which is also strong and durable, relatively inexpensive to manufacture and otherwise well adapted for the purposes for which the same is intended.

Other objects and advantages reside in the details of construction and operation as more fully hereinafter described and claimed, references being had to the accompanying drawings forming part hereof, wherein like numerals refer to like parts throughout, and in which:

Figure 1 is a side elevational view,

Figure 2 is a rear elevational view, and

Figure 3 is a side elevational view showing the foldable wheel in its folded or retracted position.

Referring now to the drawing in detail, wherein for the purpose of illustration I have disclosed a preferred embodiment of my invention, the numeral 5 designates a two-wheel hand truck and including cross bars 6.

A pair of U-shaped brackets 7 are secured to one of the cross bars 6 adjacent the handles 8 of the truck, each bracket including an inner downwardly extending apertured lug 9 spaced from each other adjacent the center of the truck, and an outer downwardly extending apertured lug 10 positioned adjacent the sides of the truck.

A rod 11 is secured in the inner lugs 9 and on which the upper end of a leg or prop 12 is swingable, the leg or prop being constructed of a pair of bars 13 held in spaced parallel relation to each other by spacing rods or the like 14. Extensions 15 are secured to the lower ends of bars 13 and are adjustable vertically by means of bolts and nuts 16 selectively secured in vertical rows of openings 17.

A cross bar 18 is secured to the lower ends of extensions 15 and to which a swivel mounting 19 is secured for a wheel 20.

A brace 21 is secured at its lower end to each of the bars 13 and are pivoted at their upper ends to the outer lugs 10 of brackets 7.

A coil spring 22 connects the leg or prop 12 to a bracket 23 at the rear end of the truck to swing the leg or prop downwardly to move the wheel 20 into position for resting on the ground to hold the truck in an inclined position, as shown in Figure 1 to support the weight of the load. The leg or prop 12 is locked in its lowered position by means of a locking lever 24 which is pivoted to a front cross bar 6 by means of an apertured bracket 25 and a rear notch 26 adapted to receive one of the spacing rods 14 of the leg or prop and the leg or prop is held in its raised position out of contact with the ground, as shown in Figure 3, by engaging the spacing rod 14 in a front notch 27 in the locking lever.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claim.

Having described the invention what is claimed as new is:

In combination with a hand truck, a pair of brackets secured to the underside of the hand truck and aligned transversely thereof in end to end spaced apart relation and including a pair of inner end apertured lugs and a pair of outer end apertured lugs, a rod supported on the inner lugs, a leg including a pair of spaced parallel bars pivoted at their upper ends on the rod for swinging forwardly and rearwardly into and out of a folded position under the hand truck, diagonal lateral braces connecting the bars to the outer apertured lugs, a wheel at the lower end of the leg, spring means swinging the leg rearwardly out of folded position, and means carried by the hand truck and engaging the leg to hold the latter in either a raised or lowered position.

CARL REICHERT.

REFERENCES CITED

The following references are of record in the file of this patent:

UNITED STATES PATENTS

| Number | Name | Date |
|---|---|---|
| 640,631 | Conti | Jan. 2, 1900 |
| 2,397,317 | Hulburt et al. | Mar. 26, 1946 |
| 2,417,553 | Jensen | Mar. 18, 1947 |